HOTCHKISS & NORTON.
Glasses for Spectacles.
No. 6,369.
Patented April 17, 1849.
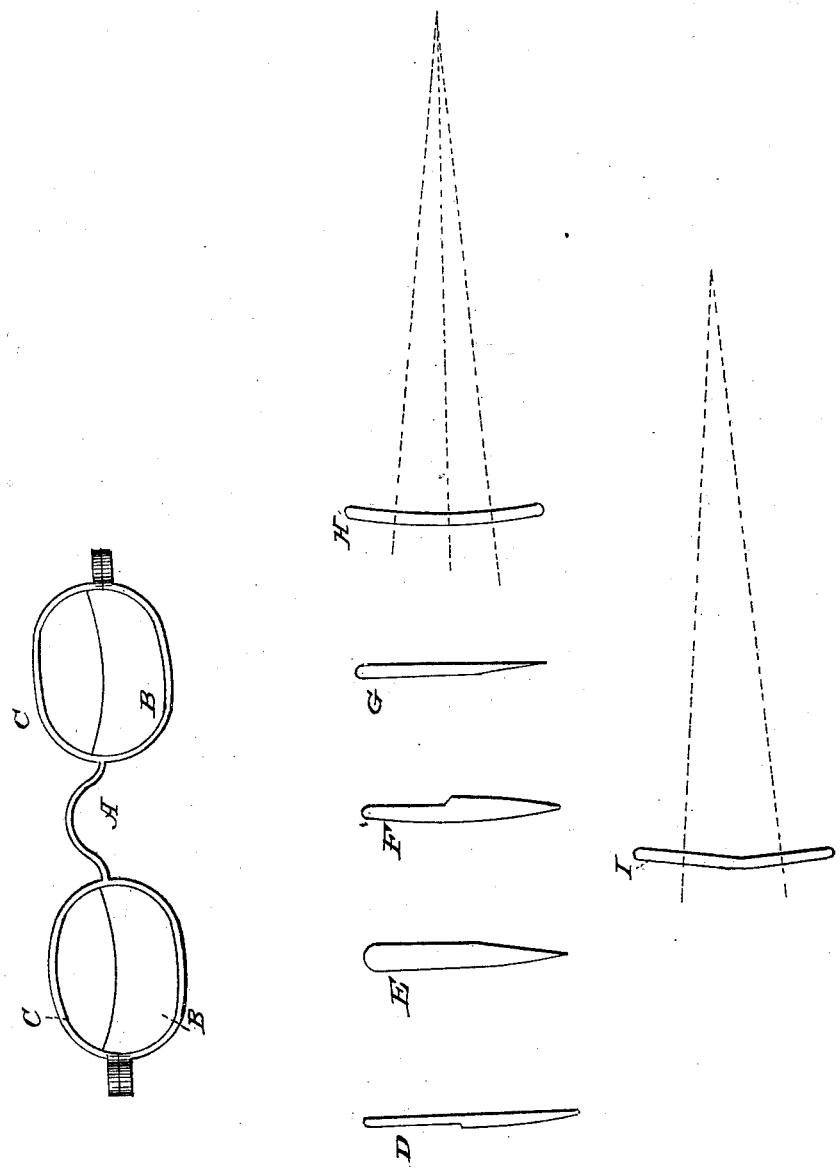

UNITED STATES PATENT OFFICE.

DAVID HOTCHKISS AND BENJAMIN R. NORTON, OF SYRACUSE, NEW YORK.

SPECTACLE-GLASS.

Specification of Letters Patent No. 6,369, dated April 17, 1849.

*To all whom it may concern:*

Be it known that we, DAVID HOTCHKISS and BENJAMIN R. NORTON, of the city of Syracuse, in the county of Onondaga and State of New York, have invented a new and useful Improvement in Glasses for Spectacles; and we do hereby declare the following to be a full, clear, and exact description of the construction and operation of the same, reference being had to the annexed drawing, making part of this specification.

The nature of our invention consists in so constructing glasses for spectacles, that the upper portion is adapted to viewing objects at a distance and the lower portion to viewing objects near the eye.

In the annexed drawings, A represents a pair of spectacles having the lower portion (B) of the glasses convex, and the upper portion (C) a plane.

(D) is a vertical section of a glass having its upper portion a plane, and its lower portion a plano convex.

(E) is a section of a glass having its upper portion a plane and its lower portion a double convex.

(F) has its upper portion a plano convex, and its lower a double convex.

(G) has its upper portion plane, and its lower plano convex.

(H) represents a vertical section of a glass having its upper portion plane, and its lower a concavo convex, and so bent that the line of either portion forms an angle with that of the other at the center.

(I) is a section of a glass having its upper portion a plane, and the lower portion a plano convex, both inner surfaces being plane and forming an angle with each other of about 10 degrees.

The forms shown at D and F may be made by grinding. Those shown at (E and G) may be made by first grinding the convex surfaces in the usual manner, and afterward, the upper portion may be heated and forced, while in a plastic state, toward the center of the glass, thereby thickening the upper portion so that the plane surfaces may be ground to the focal point as represented. Those shown at (H and I) are made by first bending a plane glass so that the inner surfaces form any desired angle with each other, and the lower portion is then ground to any form suited to viewing near objects.

Persons wearing spectacles to view near objects, look over them, or remove them to view distant objects.

By the use of our glasses, both near and distant objects may be seen distinctly, without inconvenience, through the same glass. We are aware that the same object has been imperfectly accomplished by placing two pieces of glass in the same bow, the upper glass being plane and the lower being ground to any form suited to viewing near objects, an invention which we disclaim, and which is objectionable by having a joint between the two portions of glass, and directly in front of the sight.

The form shown at (I) we have found to be the best for use.

The precise mode of bending and grinding our glasses we do not deem necessary to explain, as our invention rests upon constructing glasses in such a manner that different portions of each glass are adapted to seeing objects at different distances, without regard to the mode by which it is done or the form given to the glass.

The utility of our invention consists in the convenience with which both near and distant objects may be seen with distinctness through the same glass.

What we claim as our invention and desire to secure by Letters Patent, is—

Constructing glasses for spectacles in such a manner that the upper portion of each glass is adapted to seeing distant objects; and the lower portion to seeing objects near the eye, the two portions being in one piece, substantially as above set forth.

DAVID HOTCHKISS.
BENJAMIN R. NORTON.

Witnesses:
R. F. STEVENS,
SEYMOUR H. STONE.